United States Patent [19]
Terajima et al.

[11] Patent Number: 5,680,449
[45] Date of Patent: Oct. 21, 1997

[54] COMMUNICATION APPARATUS FOR AUTOMATIC DIALING FROM A SEPARATE TERMINAL

[75] Inventors: Hisao Terajima, Yokohama; Shigeru Koizumi, Urawa; Teruyuki Nishii, Yokohama, all of Japan

[73] Assignee: Canon Kabushiki Kaisha, Tokyo, Japan

[21] Appl. No.: 285,760

[22] Filed: Aug. 3, 1994

Related U.S. Application Data

[63] Continuation of Ser. No. 890,767, Jun. 1, 1992, abandoned.

[30] Foreign Application Priority Data

| Jun. 7, 1991 | [JP] | Japan | 3-136524 |
| Jan. 6, 1992 | [JP] | Japan | 4-018306 |
| Feb. 12, 1992 | [JP] | Japan | 4-025223 |

[51] Int. Cl.$^6$ .................................................. H04M 1/26
[52] U.S. Cl. .......................... 379/355; 379/100; 379/216
[58] Field of Search ................................. 379/100, 102, 379/105, 156, 157, 188, 196, 198, 209, 216, 239, 288, 354–357

[56] References Cited

U.S. PATENT DOCUMENTS

| 3,854,014 | 12/1974 | Akin et al. | 379/209 |
| 4,143,243 | 3/1979 | Sutton | 379/355 |
| 4,171,469 | 10/1979 | Brooks | 379/216 |
| 4,482,786 | 11/1984 | Flynn, Jr. | 379/355 |
| 4,485,274 | 11/1984 | Jordan et al. | 379/355 |
| 4,737,981 | 4/1988 | Hoberman et al. | 379/112 |
| 4,785,355 | 11/1988 | Matsumoto | 358/257 |
| 4,833,705 | 5/1989 | Kobayashi | 379/93 |
| 4,910,506 | 3/1990 | Yoshida et al. | 358/400 X |
| 4,926,471 | 5/1990 | Ikeda | 379/216 |
| 5,018,189 | 5/1991 | Kurosawa et al. | 379/93 |
| 5,022,072 | 6/1991 | Sakakibara et al. | 379/100 |
| 5,027,385 | 6/1991 | Nakagawa et al. | 379/100 |
| 5,034,976 | 7/1991 | Sato | 379/113 |
| 5,054,058 | 10/1991 | Kakizawa | 379/157 |
| 5,077,787 | 12/1991 | Masatomo | 379/100 |
| 5,090,049 | 2/1992 | Chen | 379/102 |
| 5,153,912 | 10/1992 | Sakakibara et al. | 379/96 |
| 5,239,576 | 8/1993 | Yoshida et al. | 379/355 |
| 5,289,533 | 2/1994 | Wasio et al. | 379/100 |
| 5,329,580 | 7/1994 | Yoshino | 379/90 |

FOREIGN PATENT DOCUMENTS

| 0037150 | 2/1989 | Japan | 379/209 |

*Primary Examiner*—Fan Tsang
*Assistant Examiner*—Scott L. Weaver
*Attorney, Agent, or Firm*—Fitzpatrick, Cella, Harper & Scinto

[57] ABSTRACT

A communication apparatus having an automatic dialing function such as redial, one-touch dial, abbreviated dial comprises: a memory to store the dial number; a detector to detect a predetermined hooking operation by another terminal; and a transmitter to transmit a dial signal according to the dial number stored in the memory on the basis of the detection of the predetermined hooking operation by the detector. The detector has a second detector to detect an off hook of another terminal. The transmitter sets a predetermined flag on the basis of the detection of the predetermined hooking operation and, when the off hook is detected, if the predetermined flag has been set, the dial signal according to the dial number stored in the memory is transmitted.

4 Claims, 10 Drawing Sheets

COMMUNICATION APPARATUS FOR AUTOMATIC DIALING FROM A SEPARATE TERMINAL

This application is a continuation of application Ser. No. 07/890,767 filed Jun. 1, 1992, now abandoned

BACKGROUND OF THE INVENTION

1. Field of the Invention

The invention relates to a communicating apparatus having an automatic dialing function such as redial, abbreviated dial, or the like.

2. Related Background Art

Hitherto, the redial in the case where the dial was performed from a telephone connected to a facsimile apparatus is executed by depressing a redial key of the telephone. Therefore, when the telephone doesn't have the redialing function, the redial cannot be performed.

At present, when a call is generated from the telephone connected to the facsimile apparatus, so long as the telephone number has been registered in a one-touch dial, an abbreviated dial, or the like of the facsimile apparatus, the call is generated by the one-touch dial, abbreviated dial, or the like and, thereafter, a speech communication can be executed by picking up the handset of the telephone.

When the facsimile apparatus and the telephone are installed at a remote distance, however, the user of the telephone cannot generate a call by using the one-touch dial, abbreviated dial, or the like which has been registered in the facsimile apparatus. If the telephone main body has a registering function, the same number needs to be registered or it is necessary to dial again each time.

As mentioned above, hitherto, a redundant operation required that the same telephone number must be registered into both of the facsimile apparatus and the telephone. In the case of a telephone which does not have the function such as one-touch dial, abbreviated dial, or the like, the dial must be performed every call generation and not only does operating efficiency deteriorate but also there is a fear of erroneous dial.

SUMMARY OF THE INVENTION

It is an object of the invention to provide a novel automatic dialing function.

Another object of the invention is to provide a communication apparatus which provides an automatic dial service to another terminal.

Still another object of the invention is to provide a communication apparatus which performs an automatic dial in accordance with the operation of another terminal.

Further another object of the invention is to provide a communication apparatus in which a memory for an automatic dial is commonly used by an operation unit and another terminal.

The above and other objects and features of the present invention will become apparent from the following detailed description and the appended claims with reference to the accompanying drawings.

DETAILED DESCRIPTION OF THE PREFERRED EMBODIMENTS

Figure 1:
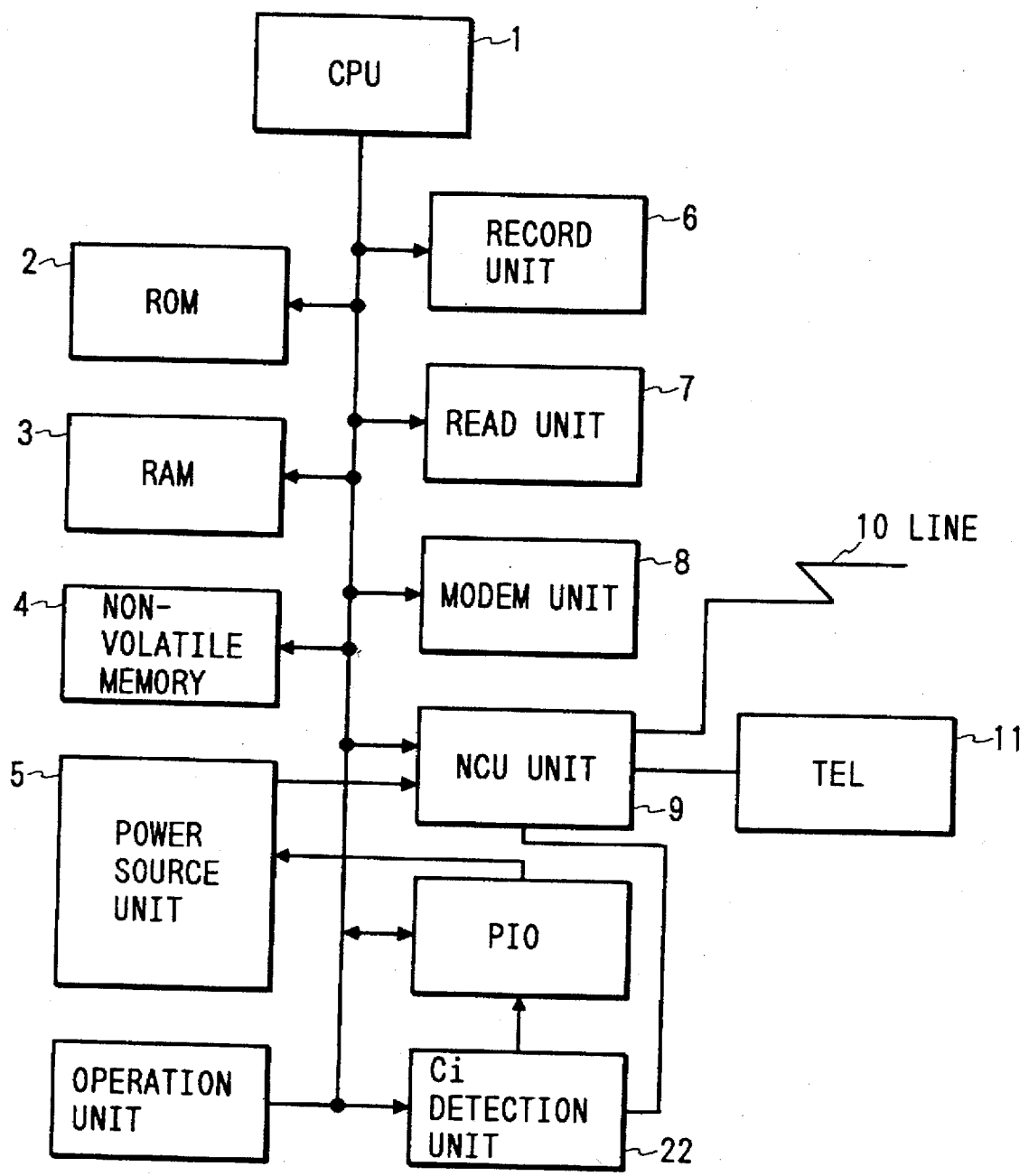
FIG. 1 is a block diagram showing a schematic construction of a first facsimile apparatus embodying the present invention.

FIG. 1 is a block diagram of a facsimile apparatus embodying the present invention.

A CPU (central processing unit) 1 controls the whole facsimile apparatus in accordance with a program stored in an ROM (read only memory) 2. A non-volatile memory 4 stores data to be preserved even in a state in which a power source unit 5 of the facsimile apparatus is shut off. A record unit 6 prints out recording data, as a hard copy, which has been read out from an RAM (random access memory) 3 by the control of the CPU 1. On the basis of the control of the CPU 1, a read unit 7 binarizes the data which has been read by using a CCD (charge coupled device) and sequentially transmits the binary data to the RAM 3.

A modem unit 8 is constructed by G3, G2, G1, and FM modems and a clock generator and the like connected to those modems. On the basis of the control of the CPU 1, the transmission data stored in the RAM 3 is modulated and supplied to a telephone line 10 through an NCU (network control unit) 9. Further, the modem unit 8 receives an analog signal of the telephone line 10 via the NCU 9 and demodulates it and stores the binary data into the RAM 3.

The NCU 9 switches and connects the line 10 to either the modem unit 8 or a telephone 11 by the control of the CPU 1. The power source unit 5 produces a power source for the facsimile apparatus. Reference numeral 22 denotes a Ci detection unit to detect a calling signal from the line 10.

Figure 2:
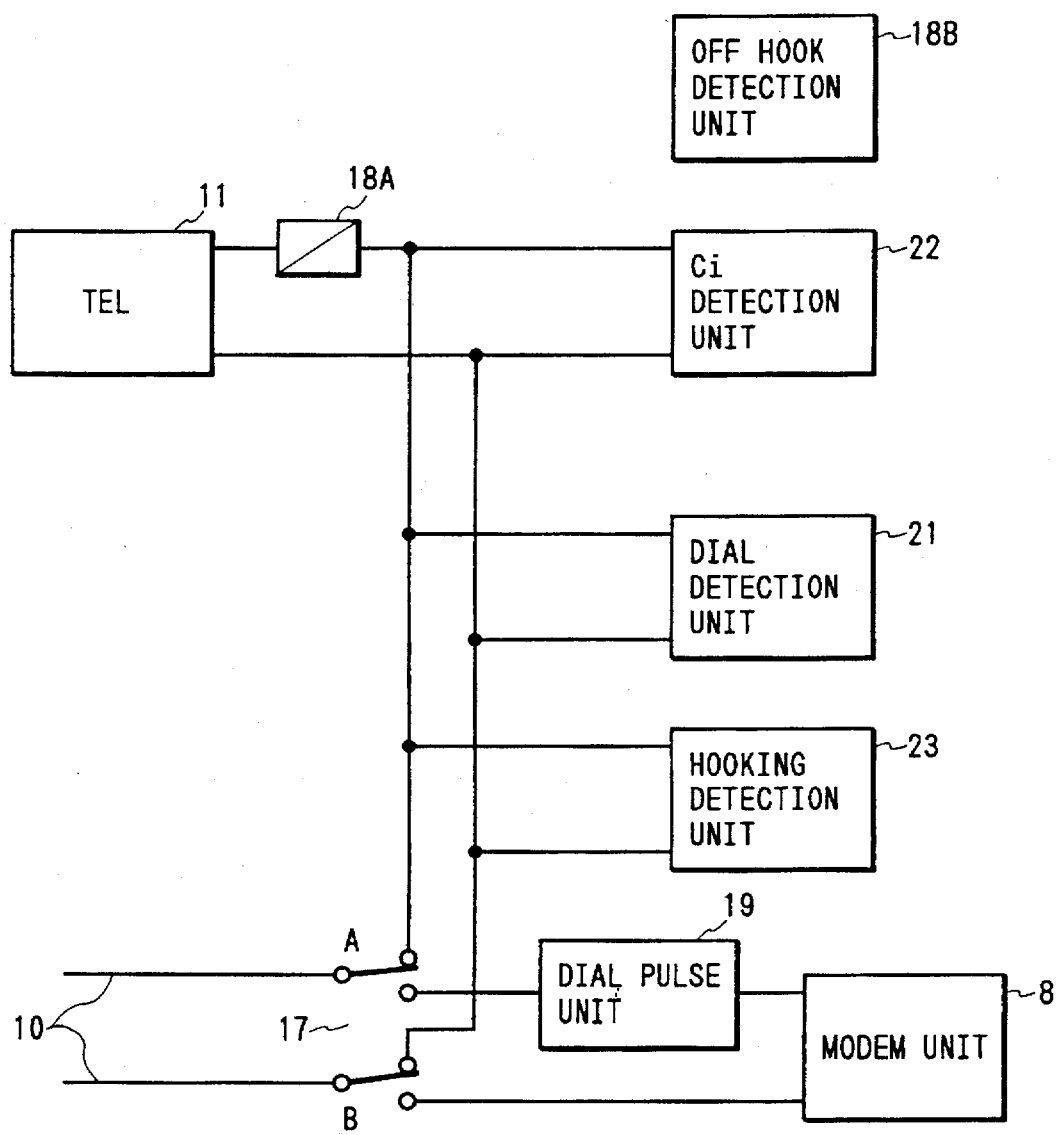
FIG. 2 is a block diagram of a network control unit of the first facsimile apparatus embodying the invention.

FIG. 2 shows a construction of the NCU.

Reference numeral 17 denotes a relay to switch and connect the line 10 to either the side B of the modem unit 8 or the side A of the telephone 11. Reference numeral 18B denotes an off hook detection unit to detect the off hook of the telephone 11; 18A a read relay; 19 a dial pulse unit; 21 a dial detection unit to detect a dial pulse and a dial tone; and 23 a hooking detection unit.

The operation of the embodiment will now be described.

First, the operator dials by depressing the telephone number of a partner side by using ten-keys of the telephone 11. The CPU 1 allows the dial detection unit 21 to detect the telephone number which has been dialed by the ten-keys of the telephone. The telephone number is stored into the memory 4.

When the partner side is busy, the operator sends a hooking signal a predetermined number of times by the telephone 11 and, thereafter, performs the on hook.

On the other hand, the CPU 1 detects the hooking signals of the predetermined number of times of the telephone 11 by the hooking detection unit 23 and sets a redial flag in the memory 4, thereby setting the apparatus into a standby mode. When the on hook is detected without detecting the hooking, the CPU 1 resets a redial flag and sets the apparatus into the stand-by mode.

When the telephone 11 is off hooked, the CPU 1 allows the off hook detection unit 18B to detect that the telephone 11 has been off hooked.

When the redial flag has been set, the CPU 1 selects whether the dial mode is in a DTMF (tone dial) or a pulse dial by referring to a software switch of the memory 4. In the case of the pulse dial, the telephone number of the redial which ha previously been stored in the memory 4 is sent from the dial pulse unit 19. In the case of the DTMF, the dial number is sent from the modem unit 8.

The redial is cancelled by the dialing operation from the telephone 11 or the operation of the communication apparatus.

In place of the hooking operation, the redial can be also registered by the DTMF or dial pulse.

The number of hooking operations can be previously set by a software switch or the like and is generally set to one or a plurality of times. In the case of using the DTMF or dial pulse in place of the hooking, numerical values of a plurality of digits can be also similarly previously set by a software switch or the like.

The invention can be also embodied in a private branch exchange instead of the facsimile apparatus.

As described above, even when the telephone connected to the redial apparatus main body doesn't have the redial function, the redial can be performed from the redial apparatus, so that it is convenient.

Figure 3:
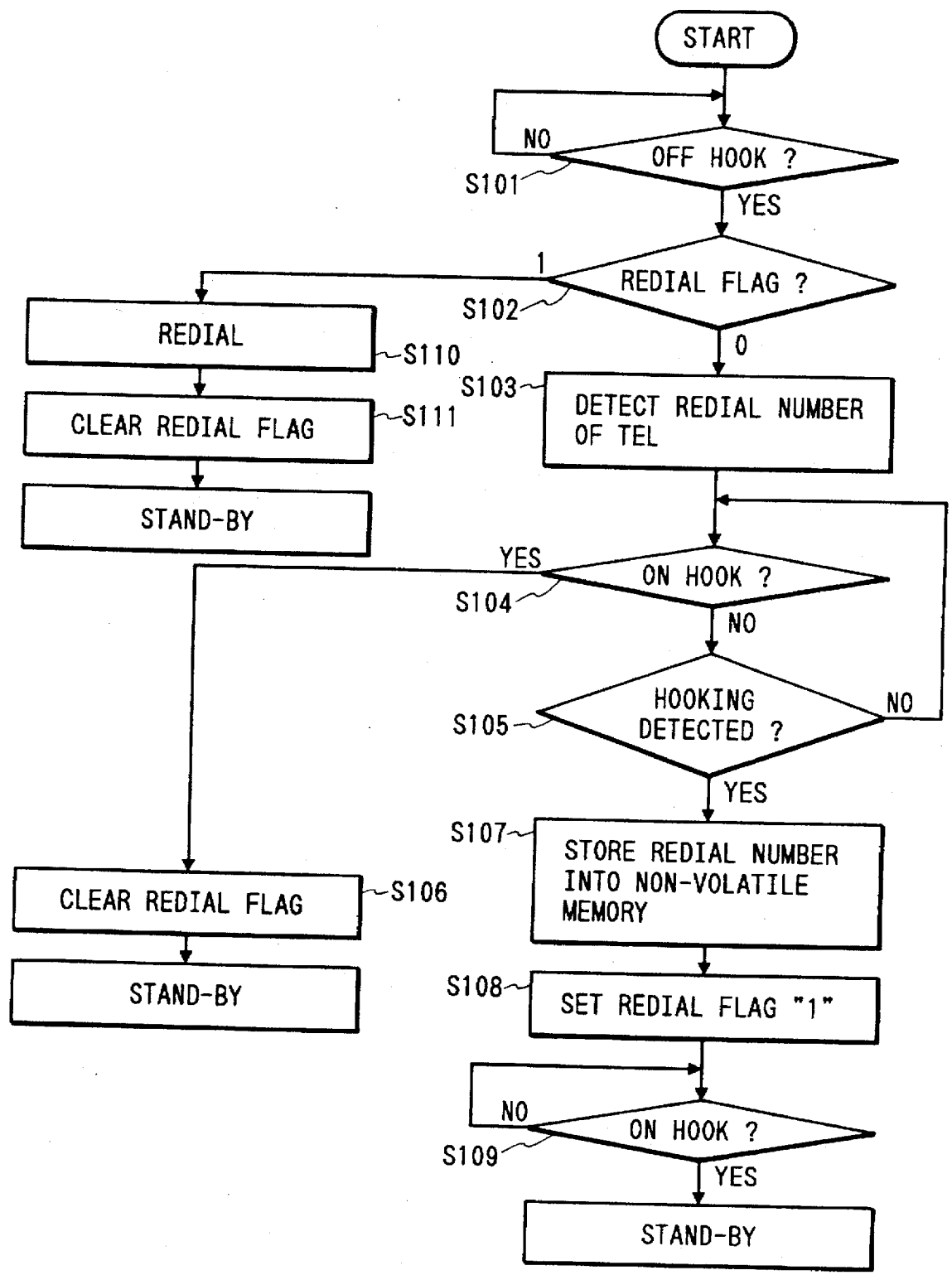
FIG. 3 is a flowchart showing the operation of the first facsimile apparatus embodying the invention.

The operation of the embodiment will now be described with reference to a flowchart shown in FIG. 3.

When the CPU 1 detects the off hook of the telephone 11 by the off hook detection unit 18B (step S101), a check is made to see if the redial flag in the non-volatile memory 4 has been set or not (S102). When the redial flag is not set, the dial number from the telephone 11 which has been detected by the dial detection unit 21 is stored into a predetermined area in the RAM 3 (S103). The CPU 1 discriminates the on hook of the telephone 11 by the off hook detection unit 18B (S104) and discriminates a predetermined number of hooking operations of the telephone 11 by the hooking detection unit 23 (S105).

When the on hook of the telephone 11 is decided in step S104, the CPU 1 clears the redial flag in the memory 4 (S106).

On the other hand, when the hooking of the telephone 11 is discriminated in step S105, the CPU 1 allows the dial number stored in the predetermined area in the RAM 3 in step S103 to be stored into a redial number area in the memory 4 (S107). The redial flag in the memory 4 is set (S108). The CPU 1 waits for the detection of the on hook of the telephone 11 by the off hook detection unit 18B (S109).

When the redial flag is set in step S102, the dial number stored in the redial number area in the memory 4 is read out and the redial is performed by the modem unit 8 or dial generation unit 19 (S110). The redial flag is cleared (S111).

Figure 4:
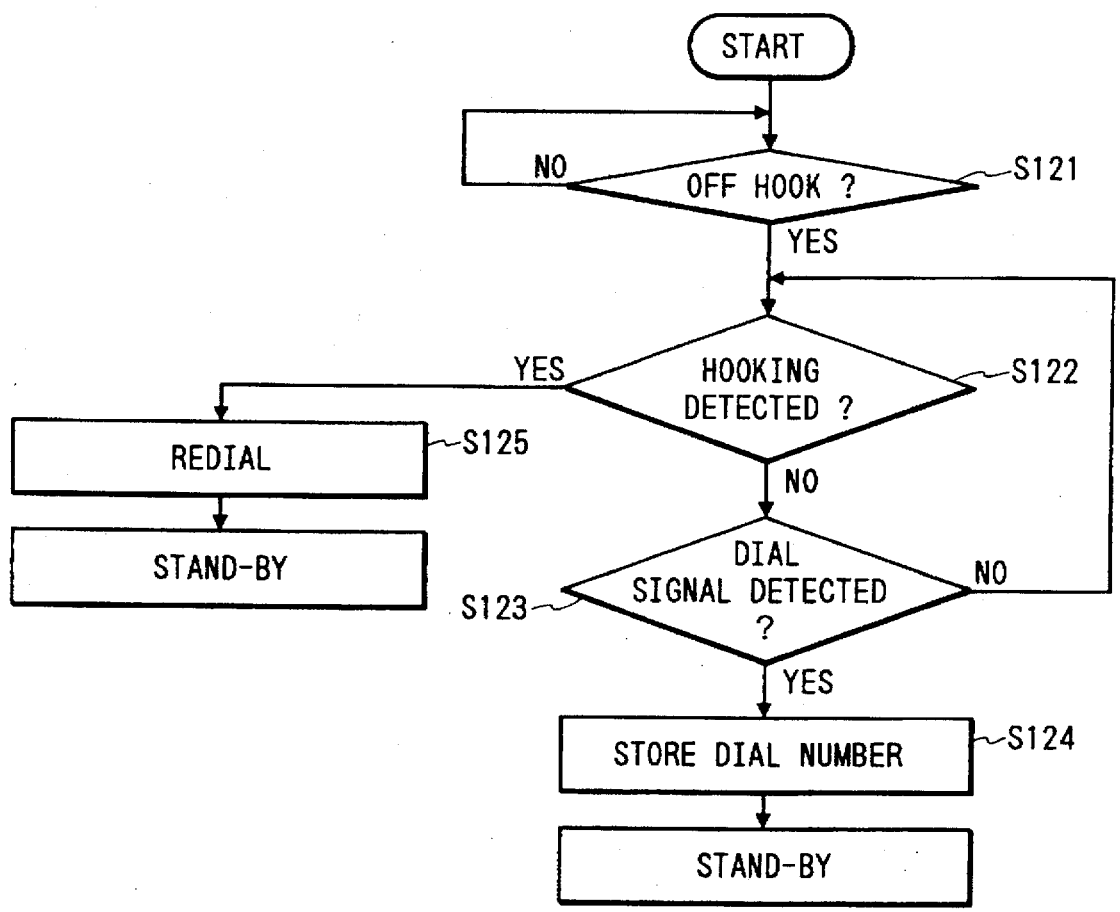
FIG. 4 is another flowchart of the first facsimile apparatus embodying the invention.

FIG. 4 shows a flowchart of another operation of the facsimile apparatus shown in FIGS. 1 and 2.

When the CPU 1 detects the off hook of the telephone 11 by the off hook detection unit 18B (S121), the CPU waits for the detection of a predetermined number of off hook times of the telephone 11 by the hooking detection unit 23 (S122) and the detection of the dial signal from the telephone 11 by the dial detection unit 21 (S123).

When the dial signal is detected in step S123, the CPU 1 stores the dial number analyzed by the dial detection unit 23 into the memory 4 (S124).

When the hooking is detected in step S122, the CPU 1 reads out the dial number stored in the memory 4 and the modem unit 8 redials by the dial pulse generation unit 19 (S125).

Figure 5:
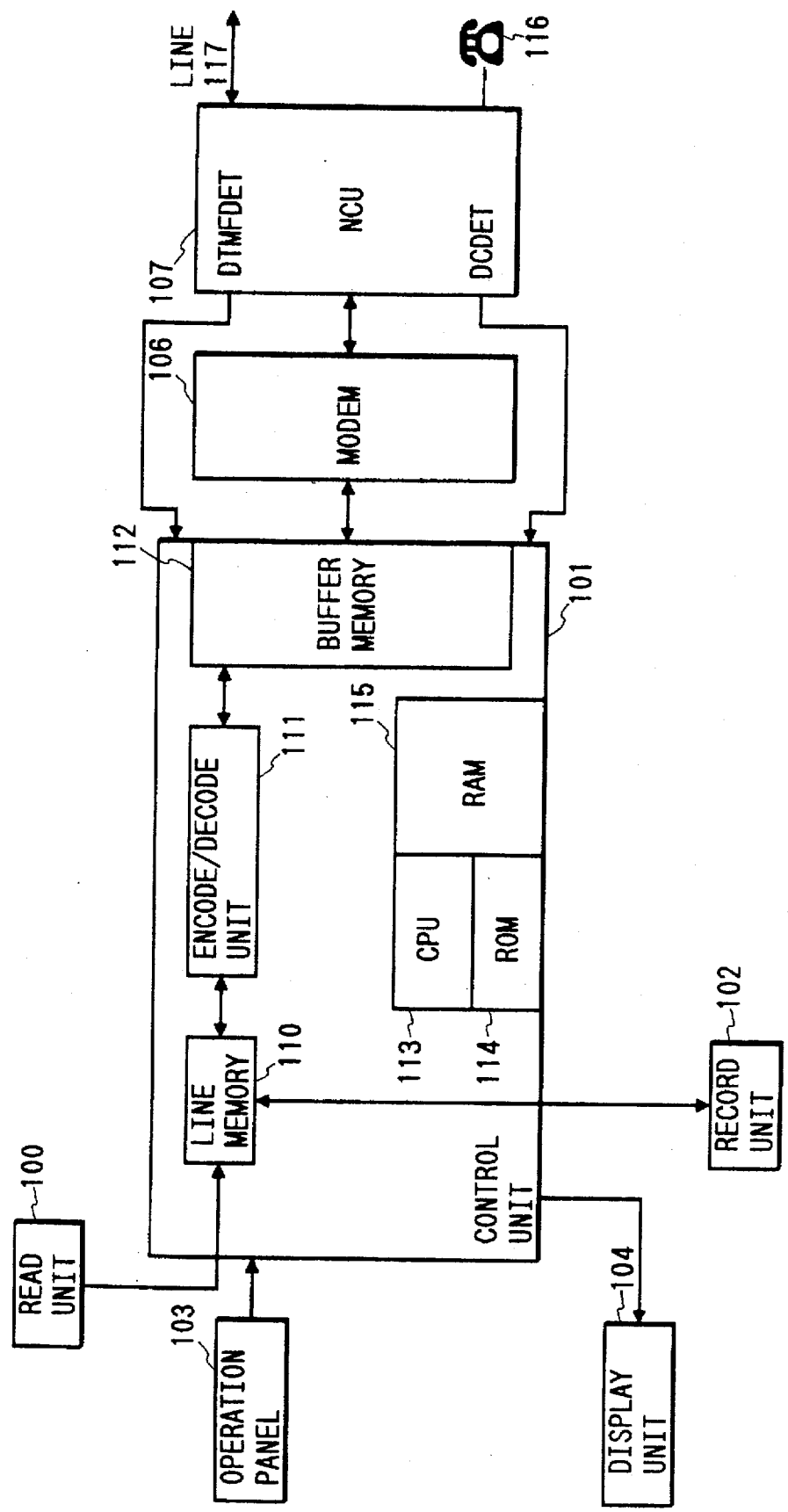
FIG. 5 is a block diagram showing a schematic construction of the second facsimile apparatus embodying the invention.
Figure 7:
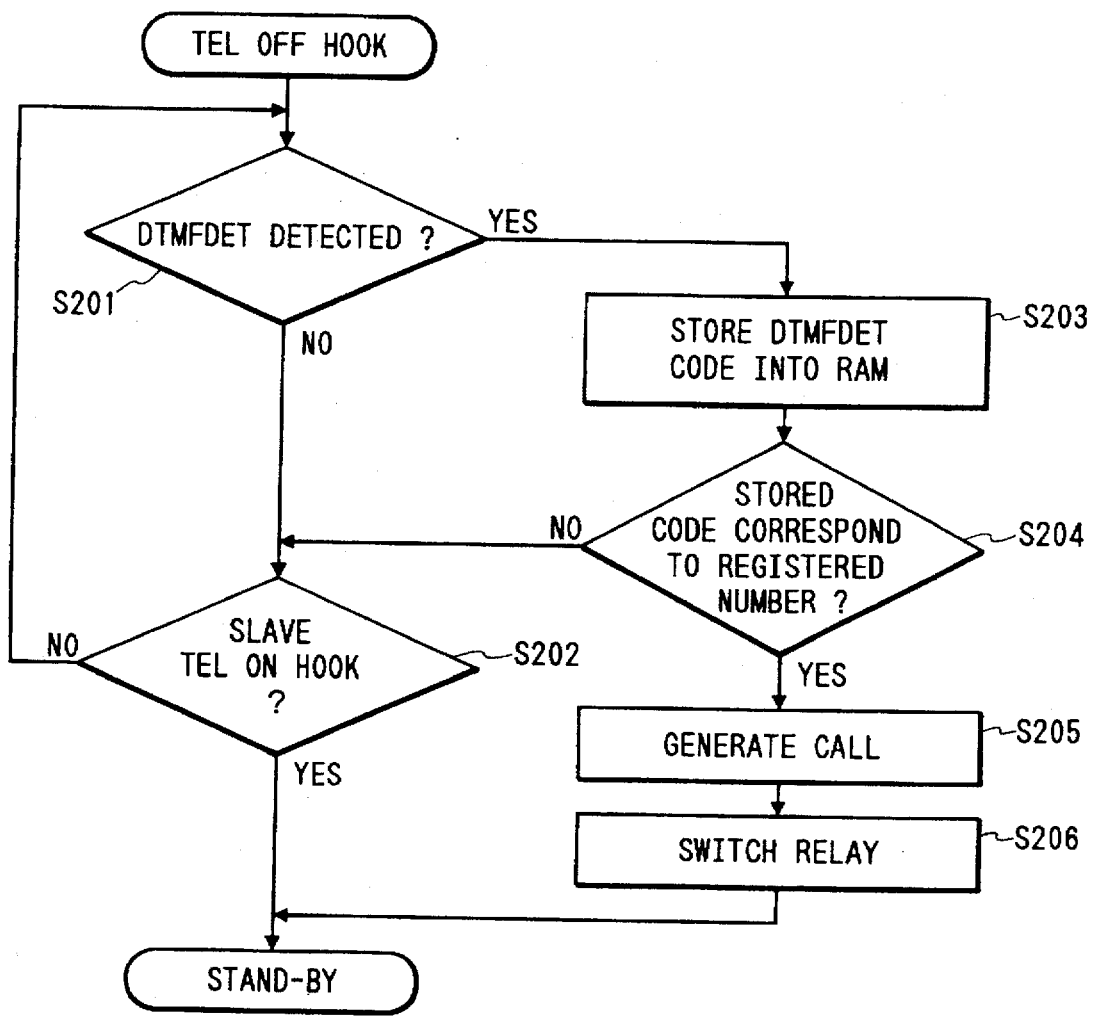
FIG. 7 is a flowchart showing the operation of the second facsimile apparatus embodying the invention.

A whole description of a second facsimile apparatus embodying the invention will be first described with reference to FIG. 5. A control unit 101 consists of a microprocessor or the like and comprises: a CPU (central processing unit) 113; an ROM (read only memory) 114; an RAM (random access memory) 115; a line memory 110; an encode/decode unit 111; and a buffer memory 112. The CPU 113 controls the input/output of an image and a whole communicating process and, particularly, controls an abbreviated transmission as shown in FIG. 7. A control program of the CPU 113 has previously been stored in the ROM 114. The RAM 115 has a work area for the CPU 113 and an area to register the abbreviated number and its corresponding telephone number in correspondence to each other for, particularly, the abbreviated transmission.

The input and output operations of an image are executed by a read unit 100 and a record unit 102. That is, the read unit 100 consists of a CCD (charge coupled device) sensor, an original conveying system, and the like and reads the image of a transmitted original or copy of an original. The record unit 102 consists of a thermal printer, an ink jet printer, or the like and records the received image data or copy original image onto a recording paper.

The input and output operations of the image data between the read unit 100 and record unit 102 and the encode/decode unit 111 are executed through the line memory 110 on a line unit basis. The input and output operations of the image data between the encode/decode unit 111 and a modem 106 are performed through the buffer memory 112 of the FIFO (first-in first-out) type. The encode/decode unit 111 is used for encoding the transmission image data and decoding the received image data in order to suppress a redundancy degree. However, the encode/decode unit 111 can be also realized by software of the CPU 113.

The connection and the data input/output operations between the communication apparatus and a communication line 117 such as a telephone line or the like are executed through the modem 106 and an NCU (network control unit) 107. A telephone 116 is connected to the NCU 107. As shown in FIG. 5, the NCU 107 generates a detection signal DCDET indicating that a direct current flows from the NCU 107 to the telephone 116 and a detection signal DTMFDET indicating that the telephone 116 supplies a DTMF (dual tone multi frequency) signal to the NCU 107 to the control unit 101.

The operation panel 103 has ten-keys to input the telephone number and various kinds of function keys to perform the registration of the abbreviated numbers and the like. In the registering mode of the abbreviated numbers, for instance, the abbreviated number of two digits which were inputted through the ten-keys and the telephone number are registered into the RAM 115 in correspondence to each other. For example, when the number of two digits is inputted subsequent to "*" upon transmission, the telephone number corresponding to such an abbreviated number is read out and a call is automatically generated to the communication line 117. A display unit 104 is provided to display the telephone number, time, or the like.

Figure 6:
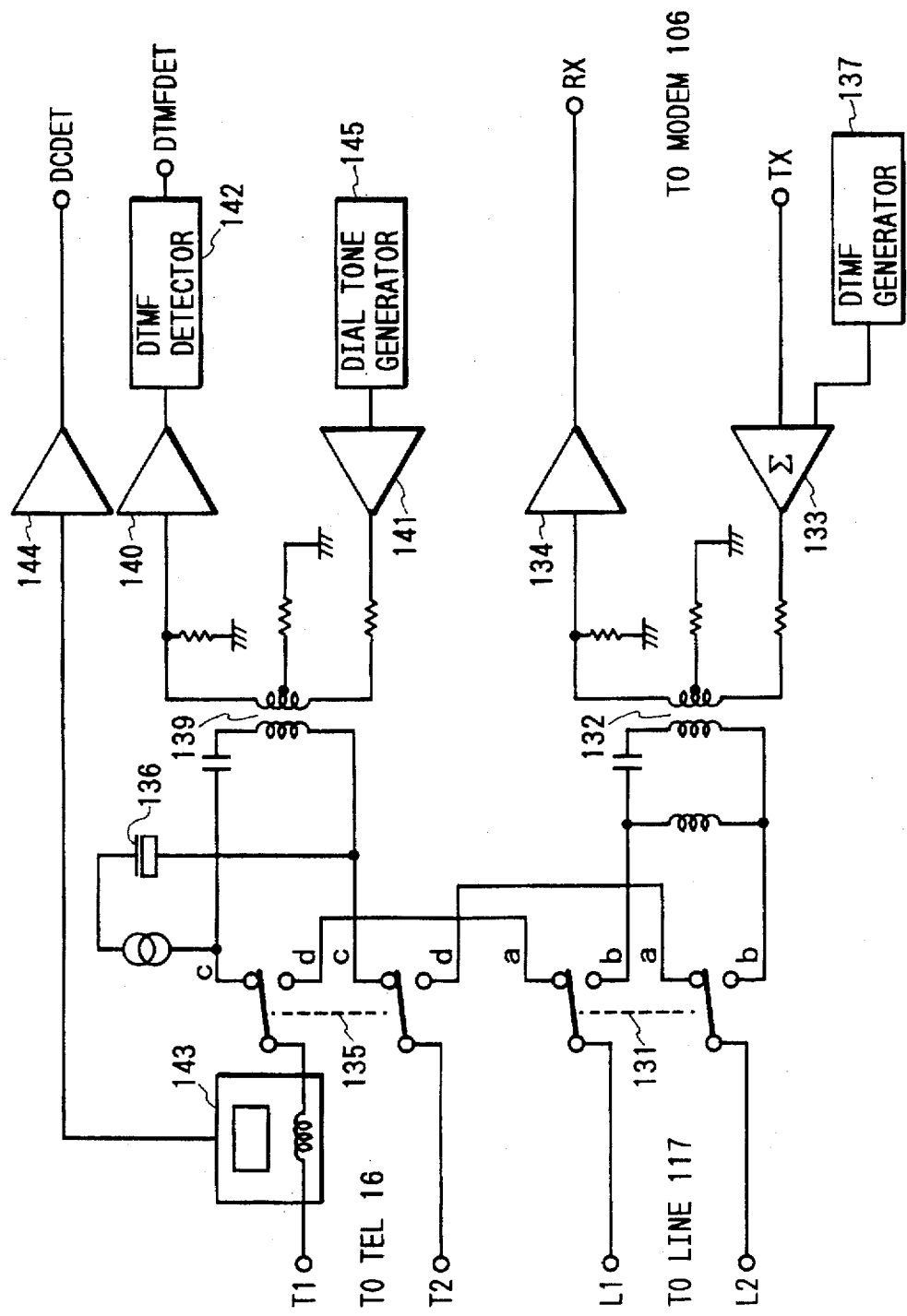
FIG. 6 is a block diagram of a network control unit of the second facsimile apparatus embodying the invention.

A detailed construction of the NCU 107 will now be described with reference to FIG. 6. A CML (Connect Modem To Line) relay contact 131 is controlled so as to connect the line 117 to the side (contact a) of the telephone 116 shown in the diagram or the side (contact b) of the modem 106 at the lower stage shown in the diagram. In the embodiment, the line 117 is a PB line and the facsimile apparatus and the telephone 116 transmit the selection signal (dial signal) of the telephone number of the partner side to the line 117 by the DTMF signal.

In the case of the facsimile communication, the CML relay contact 131 is connected to the side (contact b) of the modem 106. The reception signal supplied through the line 117 is transmitted to a reception terminal RX of the modem 106 through the CML relay contact 131, a hybrid transformer 132, and a reception buffer amplifier 134. A circuit to automatically receive the signal in the facsimile reception mode is not shown in the diagram.

On the other hand, the transmission signal from a transmission terminal TX of the modem 106 is sent to the line 117 via a transmission buffer amplifier 133, serving as an adder, the hybrid transformer 132, and the CML relay contact 131. Upon call generation, after the line 117 was closed, the DTMF signal corresponding to the telephone number of the partner side is generated from a DTMF generator 137 and is sent to the line 117 through the transmission buffer amplifier 133, hybrid transformer 132, and CML relay contact 131. When the partner side responds, the line 117 is established.

When the facsimile communication is not performed, the CML relay contact 131 is controlled so as to connect the line 117 to a relay contact 135 on the side (contact a) of the telephone 116. The relay contact 135 is controlled so as to disconnect the telephone 116 from the side of the line 117 (so as to connect to a contact c). When the telephone 116 is disconnected from the line 117 side, a DC voltage from a DC voltage source 136 is applied to the telephone 116 side via the relay contact 135. When a current flows by the off hook of the telephone 116, a current sensor 143 detects a magnetic field generated by the current by a Hall element or an MR (Magnetic Resistance) element and generates a voltage which is proportional to the current. The voltage is converted into the detection signal DCDET by a comparator 144 and supplied to the control unit 101.

A dial tone generator 145 generates a dial tone indicating that the dial can be performed to the telephone 116. The dial tone is sent to the telephone 116 via a hybrid transformer 139 and the relay contact 135. Therefore, in the off hook state of the telephone 116, there is obtained a state as if a DC loop of the telephone 116 and the line 117 was formed. There is also obtained a state as if the dial tone from the line 117 was supplied to the telephone 116. Thus, the telephone 116 is set into a state in which a call can be generated. When the telephone 116 generates a call by the DTMF signal, the DTMF signal is supplied to a DTMF signal detector 142 through the relay contact 135, hybrid transformer 139, and a buffer amplifier 140. The DTMF signal detector 142 generates the detection signal DTMFDET to the control unit 101.

The operation of the embodiment, particularly, the operation of the control unit 101 will now be described with reference to FIG. 7. In the stand-by state, the CML relay contact 131 connects the line 117 to the relay contact 135 side (slave telephone 116 side). The relay contact 135 is controlled so as to disconnect the telephone 116 from the line 117. When the control unit 101 detects the off hook of the telephone 116 by the detection signal DCDET, a check is made to see if the detection signal DTMFDET has been detected or not (step $201). When the detection signal DTMFDET is not detected, a check is made by the detection signal DCDET to see if the telephone 116 is in the on hook state or not (step S202). When the telephone 116 is not in the on hook state, the processing routine is returned from step S202 to step S201 and the processing loop of step S201→S202→S201 is repeated. When the telephone 116 is set into the on hook state in step S202, the control unit is returned to the stand-by state.

When the detection signal DTMFDET is detected in step S201, the control unit 101 stores the code of the detection signal DTMFDET into the RAM 115 (step S203). The control unit 101 stores the latest three digits of the DTMF signal detected in the past. Subsequently, a code of three digits is extracted from the RAM 115 and a check is made to see if the code of three digits is an abbreviated number or not, that is, whether it starts from "*" or not and a check is also made to see if the abbreviated number has been registered in the RAM 115 or not (step S204). In the case where the code of three digits is not the abbreviated number or the abbreviated number is not registered, the processing routine is returned to step S202 and the detection of the DTMF signal is continued. In the case where the code of three digits indicates the abbreviated number and such an abbreviated number has been registered, step S205 follows and a call is generated to the partner side (step S205).

In the call generating operation, after the CML relay contact 131 has been controlled so as to connect the line 117 to the DTMF generator 137 side (modem 106 side), the telephone number of the partner side corresponding to the abbreviated number is read out from the RAM 115. The DTMF signal generator 137 is controlled so as to generate the DTMF signal corresponding to the telephone number of the partner side. When the partner side responds, the CML relay contact 131 connects the line 117 to the relay contact 135 side. The relay contact 135 is controlled so as to connect the telephone 116 to the line 117 side and a speech communicating state is set (step S206). The control unit 101 is returned to the stand-by state.

According to the embodiment, therefore, since the telephone 116 can use the abbreviated dial function registered in the RAM 115 of the facsimile apparatus, there is no need to arrange the facsimile apparatus to the user's side.

Although the embodiment has been described above with respect to an example of the case where the telephone 116 generates a call by the DTMF signal as a selection signal, the invention can be also applied to the case where the telephone 116 generates a call by a dial pulse. In such a case, a connection/disconnection of the DC loop between the telephone 116 and the DC voltage source 136 is detected by the current sensor 143, so that the dial pulse from the telephone 116 can be detected. It is sufficient to use the telephone 116 which can generate a selection signal and there is no need to use a special telephone.

The third facsimile apparatus embodying the invention will now be described with reference to the drawings.

Figure 8:
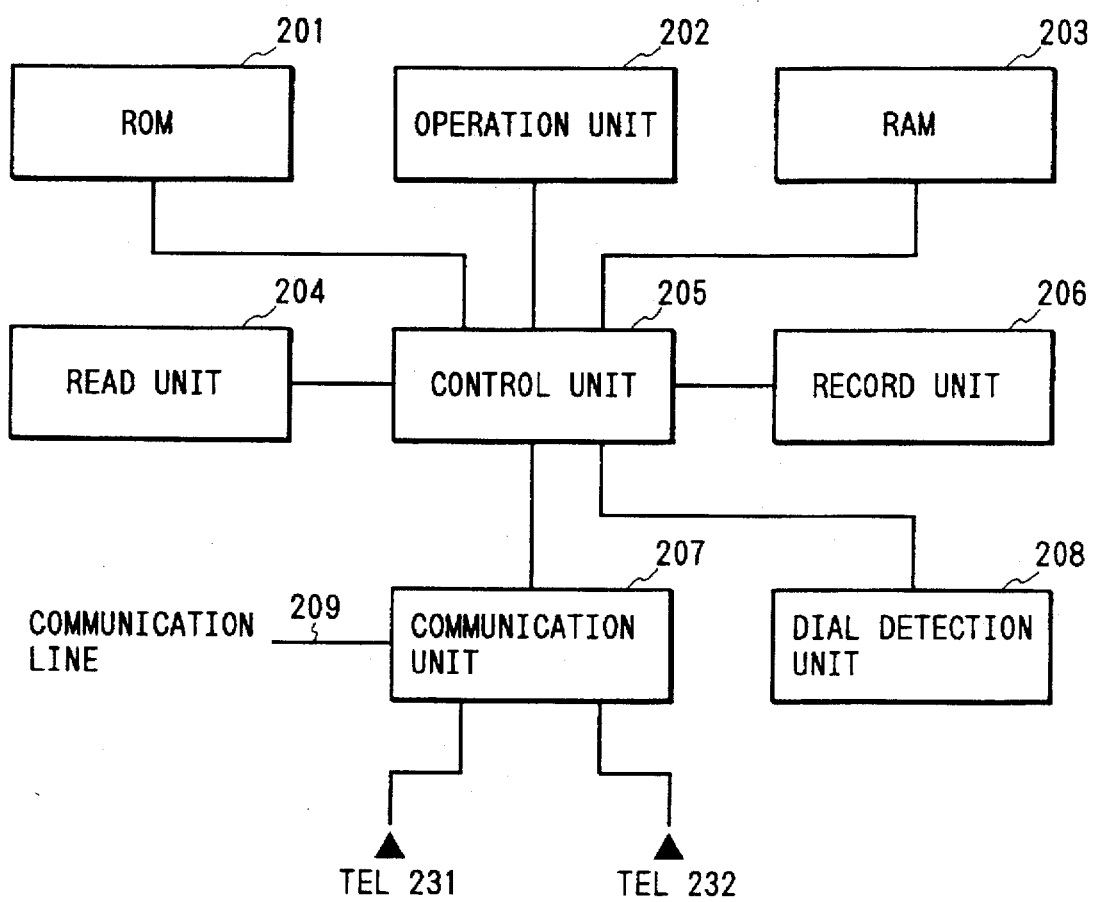
FIG. 8 is a block diagram showing a schematic construction of the third facsimile apparatus embodying the invention.

In FIG. 8, reference numeral 205 denotes a control unit comprising a microprocessor device or the like. The control unit 205 executes a whole process in accordance with a program stored in an ROM (read only memory) 201. Reference numeral 203 denotes an RAM (random access memory) to store various constants supplied from an operation unit 202 by the operator. Telephone numbers such as one-touch dial, abbreviated dial, and the like are also stored into the RAM 203. The control unit 205 executes the reading operation as necessary. Reference numeral 204 denotes a read unit to read an original; 206 a record unit to print and generate an image signal and various reports such as constants of the apparatus and the like; and 207 a communication unit comprising an NCU (network control unit), a modem, and the like. The communication unit 207 is connected to a communication line 209 and is also connected to a plurality of telephones 231 and 232 through a cross point switch SW and, further, is also connected to a dial detection unit 208 to detect any dialing signals which are sent from the telephones 231 and 232.

Figure 9:
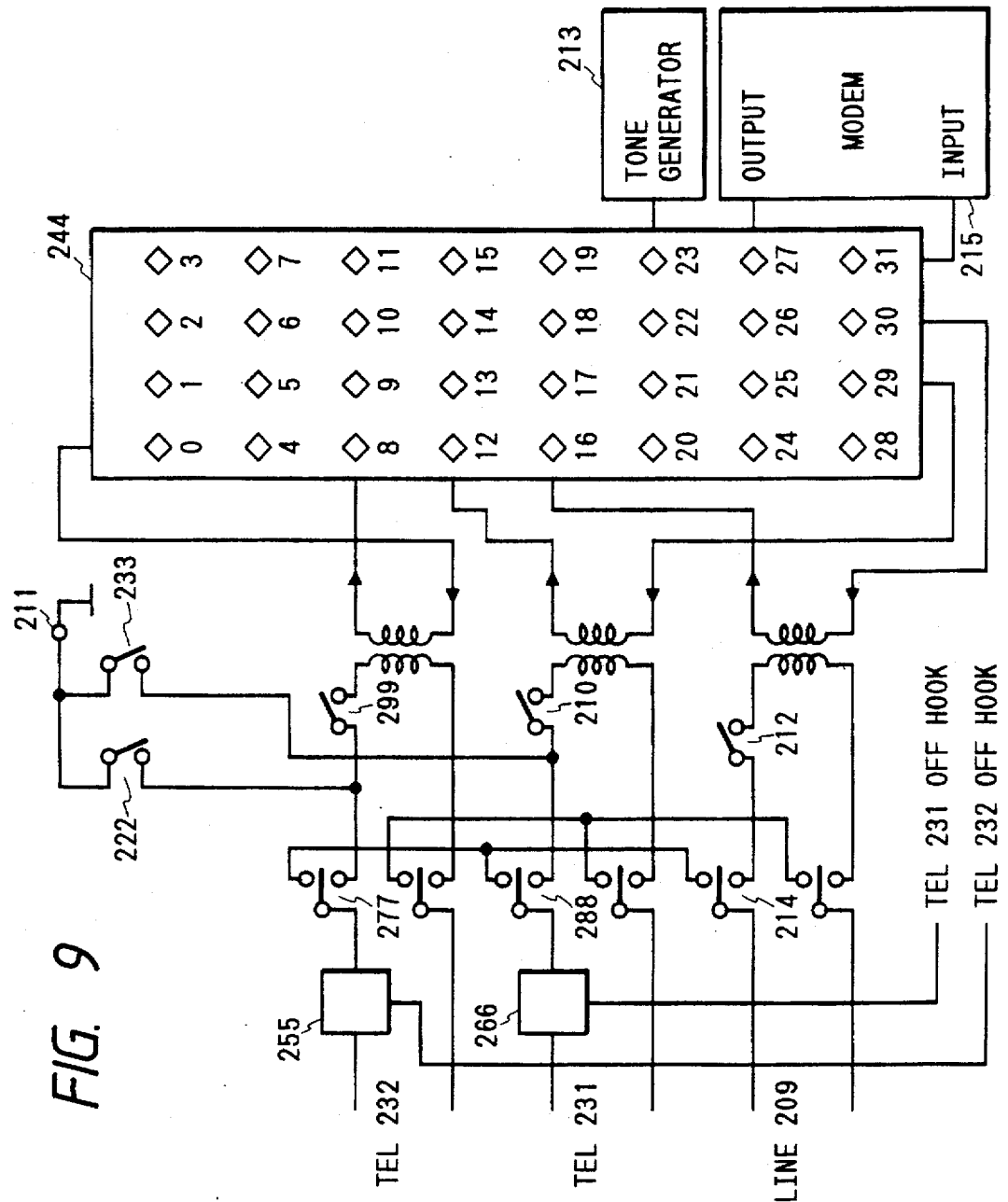
FIG. 9 is a block diagram of a communication unit of the third facsimile apparatus embodying the invention.

FIG. 9 is a block diagram of the communication unit 207.

In the diagram, reference numeral 211 denotes a calling signal generation unit for allowing the connected telephone to ring. The calling signal is turned on or off by relay switches 222 and 233. Reference numeral 244 denotes a cross point switch which is constructed by an analog switch of multi points. The line is connected and disconnected by the on/off operation of each point of the cross point switch 244. Reference numerals 255 and 266 denote monitor units to monitor the states of the telephones 232 and 231 and the communication line. The monitor units 255 and 266 also monitor the hooking states of the telephones 232 and 231, respectively. Reference numerals 277 and 288 denote relays to connect and disconnect the telephones 232 and 231 and the communication line 209, respectively; 299 and 210 indicate relays to protect the devices such as cross point switch and the like when the telephones 232 and 231 are allowed to ring by the calling signal from the calling signal generation unit 211, respectively; 214 a relay to connect and disconnect the communication line and the facsimile apparatus; 212 a relay to send the pulse dial to the communication line 209; and 215 a modem.

The detailed operation will now be described hereinbelow in accordance with a flowchart of FIG. 10.

Figure 10:
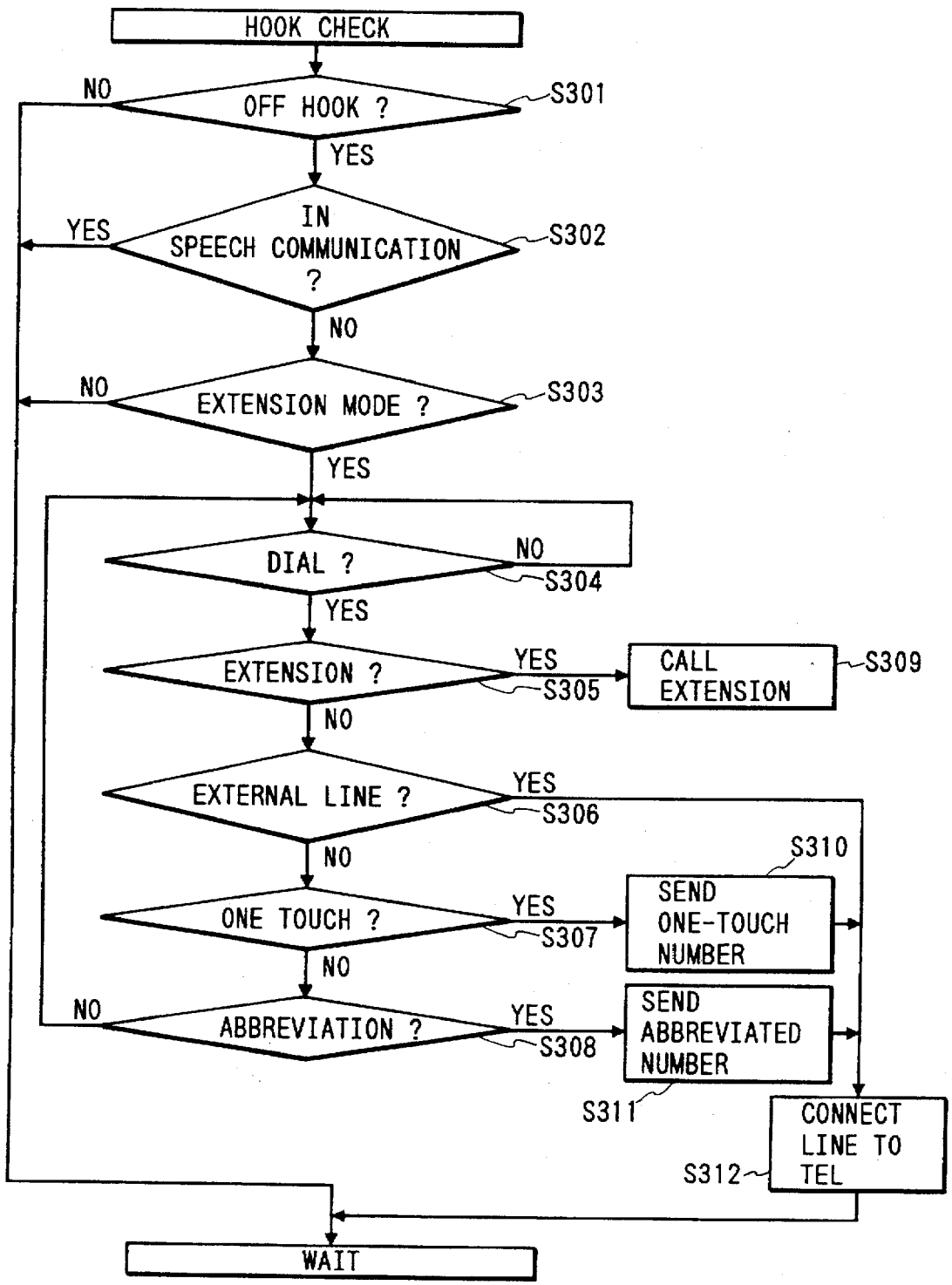
FIG. 10 is a flowchart showing the operation of the third facsimile apparatus embodying the invention.

When the control unit 205 of the facsimile apparatus is in the stand-by state, the control unit 10 executes a process such as a key check or the like and also periodically performs a hooking check in accordance with a hooking check processing routine of FIG. 10.

The control unit 205 checks the hooking state of the telephone connected in step S301. When the telephone is in the on hook state, or when the telephone is busy (that is, after completion of the call generation) in step S302 although the telephone is in the off hook state, the control unit is directly returned to the stand-by state and continues another process. An operating mode is checked in step S303. When the operating mode is an extension mode, namely, when the telephone is in the off hook state, the telephone is not directly connected to the external line but a check is made to see if the mode which is captured by the facsimile apparatus has been preset in the RAM 203 or not. When the operating mode is not the extension mode, the telephone is directly connected to the external line via the multi point switch 244, so that the control unit is returned to the stand-by state.

In case of the extension mode, a tone signal to instruct the input of a command is transmitted from a tone generator 213 through the cross point switch 244 to the handset of the off hooked telephone. The control unit subsequently waits for the transmission of a dial signal of a command from the telephone in step S304. As for the dial signal here, by monitoring the off hook signal by each of the monitor units 255 and 266, the pulse dial signal can be also detected. The tone dial signal can be detected by the modem 215. When the dial signal is detected, the control unit 205 executes a process to discriminate the dial signal. In step S305, when the detected dial signal corresponds to the preregistered extension numbers such as 11 and 12, the processing routine advances to an extension calling process in step S309. In step S306, when the dial signal such as "0" corresponding to the external line is detected, the line is connected to the off hooked telephone by the relay in step S312 and the control unit is returned to the stand-by state.

On the other hand, when the dial signal such as "7" corresponding to the mode to generate a call to an external line by using the one-touch dial registered in the facsimile apparatus is detected in step S307, from the number corresponding to the one-touch which is subsequently transmitted, the control unit 205 reads out the telephone number registered in the RAM 203 in correspondence to the one-touch operation and controls the relay 212, thereby sending the dial pulse to the line in step S310. After the dial pulse has been transmitted, the relay is switched in step S312 and the line is connected to the telephone. When the telephone number is not registered in the corresponding one-touch dial, such a number is ignored and the control units subsequently waits for the input of the next number.

In step S308, when the dial signal such as "8" corresponding to the mode to generate a call to the external line by using the abbreviated dial registered in the facsimile apparatus is detected, the control unit 205 reads out the telephone number registered in the abbreviated dial from the RAM 203 from the number corresponding to the abbreviated dial which is subsequently sent after that and controls the relay 212, thereby sending the dial pulse to the line in step S311. After the dial pulse has been transmitted, the relay is switched in step S312 and the line is connected to the telephone. When the telephone number is not registered in the corresponding abbreviated dial, such a number is ignored and the control unit subsequently waits for the input of the next number.

When the dial in step S304 corresponds to neither the extension nor the external line, it is ignored and the control unit continuously waits for the input of the dial.

For instance, it is now assumed that the telephone number 3757-2345 has been registered in the one-touch dial key of No. 6 of the facsimile apparatus. When the No. 6 of the one-touch dial of the operation unit 202 is depressed, the control unit 205 reads out the corresponding telephone number 3757-2345 from the RAM 203 and controls the relay 212 and generates a call.

On the other hand, when the monitor units 255 and 256 detect that "76" has been dialed from the telephone, the control unit 205 reads out the corresponding number "3757-2345" from the RAM 203 and controls the relay 212 and generates a call.

It is now assumed that "3758-4321 " has been registered in "13" of the abbreviated dial of the facsimile apparatus. When "*13 " is depressed in the operation unit 202, the control unit 205 reads out corresponding "3758-4321 " from the RAM 203 and controls the relay 212 and generates a call.

On the other hand, when the monitor unit detects that "*13" has been dialed from the telephone, the control unit 205 reads out corresponding "3758-4321 " from the RAM 203 and controls the relay 212 and generates a call.

According to the embodiment as mentioned above, the one-touch dial and the abbreviated dial can be used by the facsimile apparatus and the telephone in common.

In the above embodiment, the multi-point analog switch device is used to allow the tone generator 213 to generate many kinds of tones such as tone signal to instruct the input of the command to the handset of the hooked up telephone, monitor sound when the facsimile apparatus dials the designated one-touch dial, abbreviated dial, or the like, and the like. However, when no tone signal is sent to the telephone and the facsimile apparatus is dialing, if no monitor sound is returned, the analog switches of the same number as the number of telephones which can be connected can be also used.

It is also possible to use only one telephone.

It is also possible to construct in a manner such that the dial signal from the telephone is always received and analyzed by the facsimile apparatus and, when the result of the analysis indicates the one-touch or abbreviated number, the dial signal is converted with reference to the RAM 203 and, thereafter, the dial signal is sent to the line, or when the result of the analysis doesn't indicate the one-touch or the abbreviated number, the dial signal is directly sent to the line from the relay 212.

Although the present invention has been described with respect to the preferred embodiments, the invention is not limited to the foregoing embodiments but many modifications and variations are possible within the spirit and scope of the appended claims of the invention.

What is claimed is:

1. A communication apparatus comprising:

communicating means for communicating image data through a communication line;

first connecting means for connecting a separate terminal to said communication apparatus;

receiving means for receiving a plurality of signals from the separate terminal through said first connecting means, the plurality of signals including a dial signal, an off-hook signal and a predetermined signal, the dial signal corresponding to a dial number identifying a destination apparatus;

second connecting means for connecting said communication apparatus to the communication line;

detecting means for detecting whether the predetermined signal is received, said detecting means being enabled at all times during a detection time to detect whether the predetermined signal is received, the detection time beginning when the dial signal is received by said receiving means and continuing while the separate terminal is still in a first off-hook state; and redial structure, including memory means and transmitting means, for use by said communicating means for redialing the destination apparatus, said memory means being responsive to a detected receipt of the predetermined signal during the detection time for storing the dial number corresponding to the dial signal as a stored dial number, and said transmitting means, connected to said memory means, being responsive to a presence, in said memory means, of the stored dial number, and enabled at all times after termination of the first off-hook state to respond to receipt of a second off-hook signal from the separate terminal by transmitting to the communication line the dial signal corresponding to the stored dial number to connect the communication line to the destination apparatus, whereby both said communicating means and the separate terminal can use the redial structure.

2. An apparatus according to claim 1, wherein said communicating means includes a modem for transmitting the image data.

3. An apparatus according to claim 1, wherein said receiving means includes second detecting means for detecting the dial signal.

4. An apparatus according to claim 1, wherein said receiving means includes second detecting means for detecting each off-hook signal received from the separate terminal.

* * * * *